T. H. TABOR.
VEGETABLE AND FRUIT SLICER.
APPLICATION FILED OCT. 14, 1909.

950,415.

Patented Feb. 22, 1910.
2 SHEETS—SHEET 1.

Inventor
Thomas H. Tabor,

Witnesses
J. H. Crawford
V. B. Hillyard

By Victor J. Evans
Attorney

T. H. TABOR.
VEGETABLE AND FRUIT SLICER.
APPLICATION FILED OCT. 14, 1909.

950,415.

Patented Feb. 22, 1910.

2 SHEETS—SHEET 2.

Witnesses
J. H. Crawford
V. B. Hillyard.

Inventor
Thomas H. Tabor,
By Victor J. Evans
Attorney

UNITED STATES PATENT OFFICE.

THOMAS H. TABOR, OF ELLIJAY, GEORGIA.

VEGETABLE AND FRUIT SLICER.

950,415.  Specification of Letters Patent.  Patented Feb. 22, 1910.

Application filed October 14, 1909. Serial No. 522,564.

*To all whom it may concern:*

Be it known that I, THOMAS H. TABOR, a citizen of the United States, residing at Ellijay, in the county of Gilmer and State of Georgia, have invented new and useful Improvements in Vegetable and Fruit Slicers, of which the following is a specification.

The present invention provides a culinary article designed most especially for use in preparing food, such as vegetables and fruit, whereby the same may be given a variety of pleasing forms and rendered more susceptible to the cooking or baking process.

The invention appertains more particularly to the variety of implements embodying a frame provided with a cutter, a guide and a slide mounted upon the frame and adapted to receive the vegetable or fruit to be sliced or cut, the purpose being to provide an improved construction admitting of a variety of changes and adjustments according to the result to be effected.

The invention consists of the novel features, details of construction and combination of parts, which hereinafter will be more particularly set forth, illustrated in the accompanying drawings, and pointed out in the appended claims.

Figure 1:
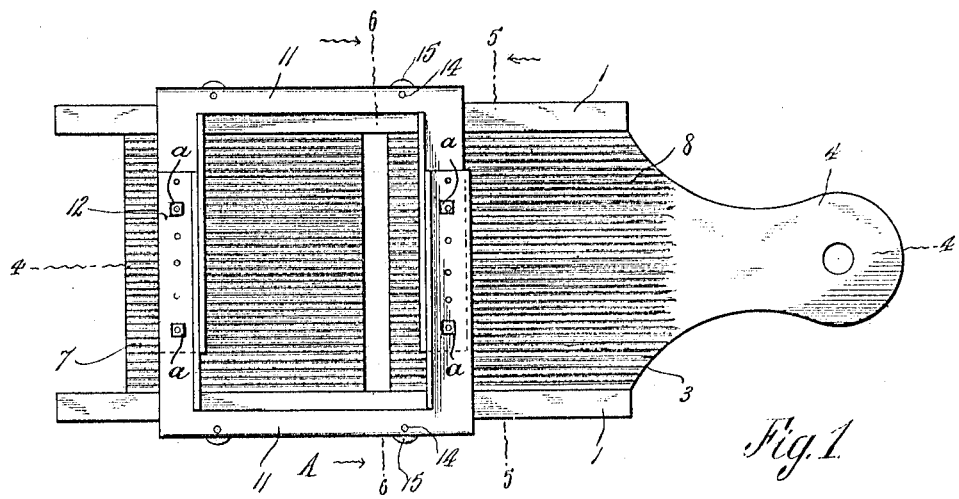
Figure 2:
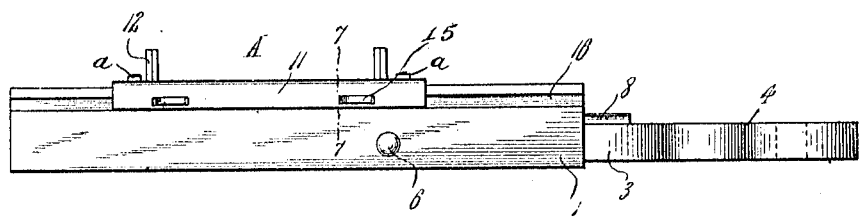
Figure 3:
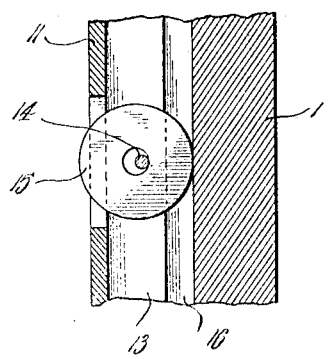
Figure 3:
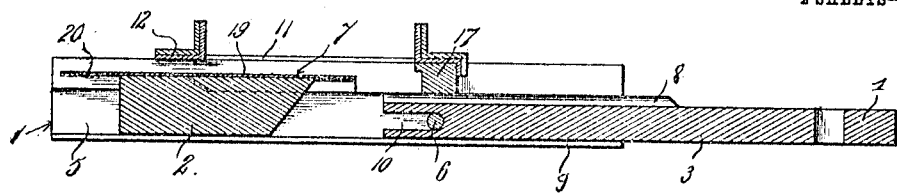
Figure 4:
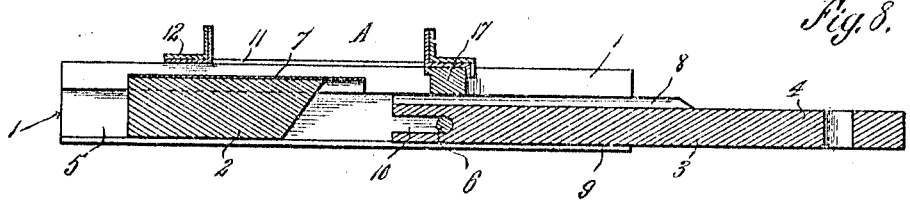
Figure 9:
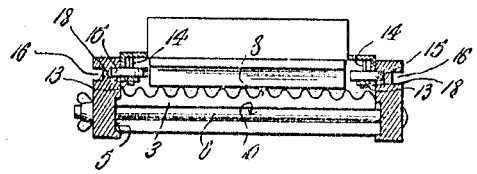
Figure 5:
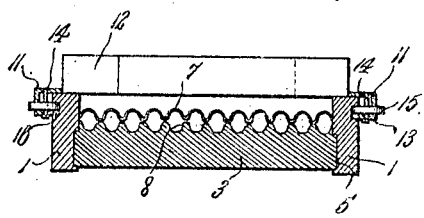
Figure 6:
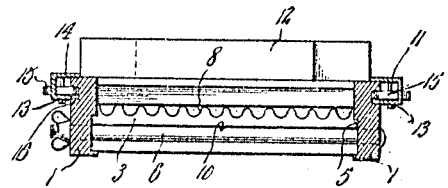
Figure 7:
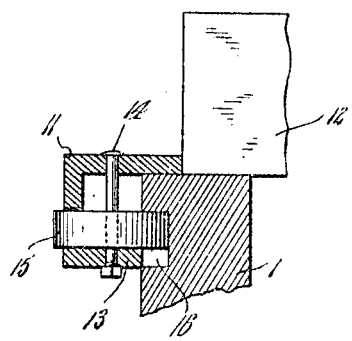
Figure 10:
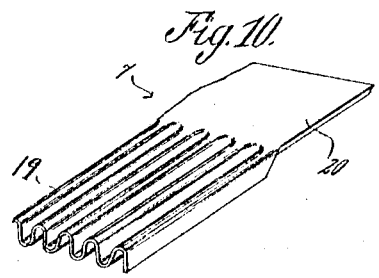

Referring to the drawings, forming a part of the specification, Figure 1 is a top plan view of a vegetable and fruit slicer and cutter embodying the invention. Fig. 2 is an edge view of the device. Fig. 3 is a detail view of a portion of a side bar and slide, showing one of the wheels whereby the slide is retained in place and the friction relieved. Fig. 4 is a vertical central longitudinal section of the device on the line 4—4 of Fig. 1. Fig. 5 is a transverse section on the line 5—5 of Fig. 1, looking to the left as indicated by the arrows. Fig. 6 is a cross section on the line 6—6 of Fig. 5, looking to the right, as indicated by the arrows. Fig. 7 is a detail section of a side portion of the device on the line 7—7 of Fig. 2, showing the parts on a larger scale. Fig. 8 is a view similar to Fig. 4 of a modification. Fig. 9 is a transverse section of the modification illustrated in Fig. 8. Fig. 10 is a perspective view of a side portion of a modified form of cutter plate.

Corresponding and like parts are referred to in the following description, and indicated in all the views of the drawings, by the same reference characters.

The device comprises a main frame consisting of side bars 1 and a bed piece 2, the latter being secured between corresponding end portions of the side bars. A guide 3 is secured between the opposite end portions of the side bars and is provided with a handle 4. The opposing ends of the bed piece 2 and guide 3 are spaced apart to provide a throat or clearance space for the discharge of the cuttings when slicing vegetables or fruit. Grooves 5 are formed in the inner sides of the bars 1 and extend the entire length thereof and form channels in which opposite edge portions of the bed piece 2 and guide 3 are fitted, thereby enabling said parts to be clamped between the side bars by means of a single bolt or fastening 6 without permitting either the bed piece or the guide to move or turn.

The bed piece 2 is provided upon its upper side with a plate 7, which constitutes a cutter, an edge portion projecting beyond the inner edge of the bed piece 2 and overhanging the throat or space formed between said bed piece 2 and the guide 3. The plate 7 may be secured to the bed piece 2 in any manner and is preferably fluted to provide a corrugated or fluted cutting edge, whereby the fruit or vegetables when cut may be given a vermiform appearance.

The guide 3 consists of a plate and one side has flutes or ribs 8 corresponding to the flutes or corrugations of the plate 7 and the opposite side is plain, as indicated at 9. The guide is reversible so that either the fluted side 8 or the plain side 9 may be brought uppermost according to the design of the cuttings when slicing fruit or vegetables. Upon loosening the bolt or fastening 6 the guide 3 may be turned outward from between the side bars 1 and after being inverted may be replaced. In order that the bolt or fastening 6 may occupy an approximately central position of the side bars and to admit of the inner end of the guide approaching close to the cutting edge of the plate 7 a slot 10 is formed in the inner end of the guide and receives the bolt or fastening 6, as indicated most clearly in Fig. 4.

A slide frame A is mounted upon the frame and comprises longitudinal bars 11 and transverse bars 12. The longitudinal bars 11 are of angle formation, one flange overlapping a side bar 1 and the other flange extending along the outer side of the bar 1 and formed at its lower edge with an inner flange 13 to stiffen and strengthen the longitudinal bars and to form a support for the lower ends of the pins 14 upon which wheels 15 are mounted. The openings in the wheels 15 are somewhat larger than the pins 14, as indicated in Fig. 3, to admit of the wheels having a limited play so as to prevent binding and to allow for contraction and expansion of the main frame. The transverse bars 12 are extensible and comprise complemental sections, which are fitted together and secured by bolts $a$, or fastenings of any nature. The transverse bars are also of angle formation, one flange or member extending horizontally and the other flange or member projecting upwardly or away from the plane of the bed piece 2, so as to form a support for sustaining the fruit or vegetables to be cut or sliced. The wheels 15 are flat and approximately of disk form and project beyond opposite sides of the vertical portion of the longitudinal bars 11 and are adapted to enter longitudinal grooves 16 formed in the outer sides of the bars 1 near the upper edge thereof. When the inner edge portions of the wheels 15 are entered into the grooves 16 the slide frame A is held upon the main frame and the friction reduced to the smallest amount possible. One of the transverse bars 12 is provided upon its lower side with a bar 17, forming a stop to limit the movement of the slide frame when pushed forward over the bed piece 2. The bar 17 is of wood, so that when coming in contact with the edge of the cutter plate 7 it will not dull said edge. The slide frame is preferably constructed of metal and formed of similar side pieces of approximately U-form, as indicated most clearly in Fig. 1, said side pieces being laterally adjustable.

In the modification shown in Figs. 8, 9 and 10 the plate 7 has an end portion 19 fluted and an end portion 20 plain, so that vegetables or fruits may either be sliced or cut into strings to present a vermiform appearance.

Upon loosening the bolt or fastening 6 the bed piece 2 may be slipped from between the side bars 1 and adjusted so as to present either a fluted cutting edge or a straight cutting edge according to the manner of cut to be produced. When the bed piece 2 is adjusted to present a straight cutting edge the guide 3 may be also adjusted so that its bent or fluted face 9 may be uppermost. Other guide grooves 18 are formed upon the inner faces of the side bars 1 opposite the other guide grooves 16 and the width of the slide frame may be contracted so that it may come between the side bars, the outer projecting edge portions of the wheels 15 entering the inner grooves 18, this being shown most clearly in Fig. 9.

Devices of the nature herein disclosed are for the most part constructed of wood, which is susceptible to contraction and expansion according to conditions, hence the desirability of providing a slide frame which may be adjusted to varying distances between the side bars 1 incident to variations in workmanship and variations resulting from contraction and expansion. In order that the slide frame may not be displaced the ends of the guide grooves may be closed and in this event the advantage of the lateral adjustment of the slide frame is manifest, since the guide wheels 15 may be caused to enter the guide grooves or be withdrawn therefrom accordingly as the slide frame is placed in position or removed from the main frame of the cutter. The provision of guide grooves in both the inner and the outer sides of the longitudinal bars 1 admits of the slide frame being adjusted so that the wheels 15 may enter either the inner or the outer guide grooves, this being of special advantage since the period of usefulness of the device is prolonged because when one set of guide grooves becomes worn the other set may be brought into active service, thereby doubling the life of the machine.

It is to be understood that the several parts, such as the guide 3 and bed piece 2, are provided in stock sizes and the width of such pieces varies according to the nature of the grain and the extent of seasoning of the wood from which the parts are formed, hence after said parts have been cut for some time they vary in width because of unequal contraction. When assembling such parts it is readily apparent that if the slide frame were of fixed dimensions considerable difficulty would be experienced in assembling the parts and frequently a bad fit would result. All these objections are overcome by constructing the slide frame so that it may be adjusted in width to suit the width of the main frame after the side bars, guide and bed piece have been assembled.

Having thus described the invention what is claimed as new, is:—

1. In a vegetable and fruit slicer, the combination of a main frame comprising side longitudinal guides and a bed piece provided with a cutter, a slide frame mounted upon the main frame and comprising longitudinal members adapted to enter either the inner or the outer sides of said longitudinal guides, and adjustable transverse members to admit of the lateral adjustment of said longitudinal members for the purpose specified.

2. A vegetable and fruit slicer and cutter comprising a main frame embodying a bed piece provided with a cutter and side longitudinal guides formed with grooves in a face thereof, a slide frame mounted upon the main frame and comprising transverse members adapted to be lengthened or shortened, and wheels mounted in the side bars of the slide frame and adapted to enter the grooves of the side pieces of the main frame.

3. In a vegetable and fruit slicer and cutter, the combination of side bars having longitudinal grooves in their inner faces, a bed piece and a guide having their edge portions inserted in the grooves of said side bars, the guide having an open slot at its inner end and having one side longitudinally fluted and the opposite side plain, a cutter mounted upon the bed piece, and a fastening located intermediate the ends of the side bars and between the inner ends of the guide and bed piece and connecting said side bars and clamping them against opposite edges of the bed piece and guide, said fastening passing through the slot at the inner end of the guide.

4. In a vegetable and fruit slicer, the combination of a bed piece and guide, longitudinal bars having portions extending above said bed and guide and provided in opposite faces with longitudinal grooves, a slide frame mounted upon said side bars and comprising longitudinal members and sectional transverse members, the latter being adjustable to admit of the longitudinal members engaging with either the inner or the outer faces of said side bars, means for securing the sections of the transverse members in the adjusted position, and wheels mounted upon the longitudinal members of the slide frame and projecting beyond opposite sides thereof to admit of their inner or outer portions entering the longitudinal grooves in the outer or the inner faces of said side bars.

5. A vegetable and fruit slicer and cutter comprising side bars having longitudinal grooves in opposite sides, a bed piece arranged between corresponding end portions of the side bars, a plate mounted upon the bed piece and having end portions extending beyond opposite ends of said bed piece and terminating in cutting edges, one end portion of the plate being fluted and the opposite end portion being flat, whereby a fluted or a straight cutting edge may be presented, a guide arranged between the opposite end portions of the side bars and having one side fluted and the opposite side plain, means for connecting the side bars and securing the bed piece and guide between them, a slide frame mounted upon the main frame and comprising adjustable transverse bars, and wheels mounted in the longitudinal bars of the slide frame and adapted to enter the guide grooves of the said side bars.

In testimony whereof I affix my signature in presence of two witnesses.

THOMAS H. TABOR.

Witnesses:
W. H. ALLEN,
J. C. WELCH.